', 'United States Patent [19]

Kim

[11] 4,038,643
[45] July 26, 1977

[54] MICROPROGRAMMING CONTROL SYSTEM

[75] Inventor: Dongsung Robert Kim, Fountain Valley, Calif.

[73] Assignee: Burroughs Corporation, Detroit, Mich.

[21] Appl. No.: 628,745

[22] Filed: Nov. 4, 1975

[51] Int. Cl.² .............................................. G06F 9/16
[52] U.S. Cl. .................................................... 364/200
[58] Field of Search .................................... 340/172.5

[56] References Cited

U.S. PATENT DOCUMENTS

| 3,781,823 | 12/1973 | Senese | 340/172.5 |
| 3,786,434 | 1/1974 | Frye et al. | 340/172.5 |
| 3,794,979 | 2/1974 | McMahon | 340/172.5 |
| 4,001,788 | 1/1977 | Patterson et al. | 340/172.5 |

Primary Examiner—Gareth D. Shaw
Assistant Examiner—C. T. Bartz
Attorney, Agent, or Firm—Nathan Cass; Kevin R. Peterson; Edward J. Feeney, Jr.

[57] ABSTRACT

Improved means and methods for controlling the sequencing and branching of microinstructions in a microprogrammed digital data processing system. Microinstructions are stored without replication in a programmable read-only control memory and corresponding microinstruction addresses and associated test select bits are stored in a separate programmable read-only memory having an instruction address storage capacity which is a predetermined multiple of the number of microinstructions in the control memory depending upon the branching capability desired. A common address register is used for both of the control and address memories, the remaining portion of the control memory addressing being derived from testing particular system conditions selected by test select signals obtained from the address memory. The mapping of microinstruction addresses and test select bits in the multiple storage locations in the address memory are chosen in conjunction with the addressing provided by the common address register and the results of testing selected system conditions so that a significant portion of the microinstruction sequencing and branching logic normally required to perform a microroutine is instead provided by the operation of the address memory in a highly flexible and unrestricted manner.

17 Claims, 8 Drawing Figures

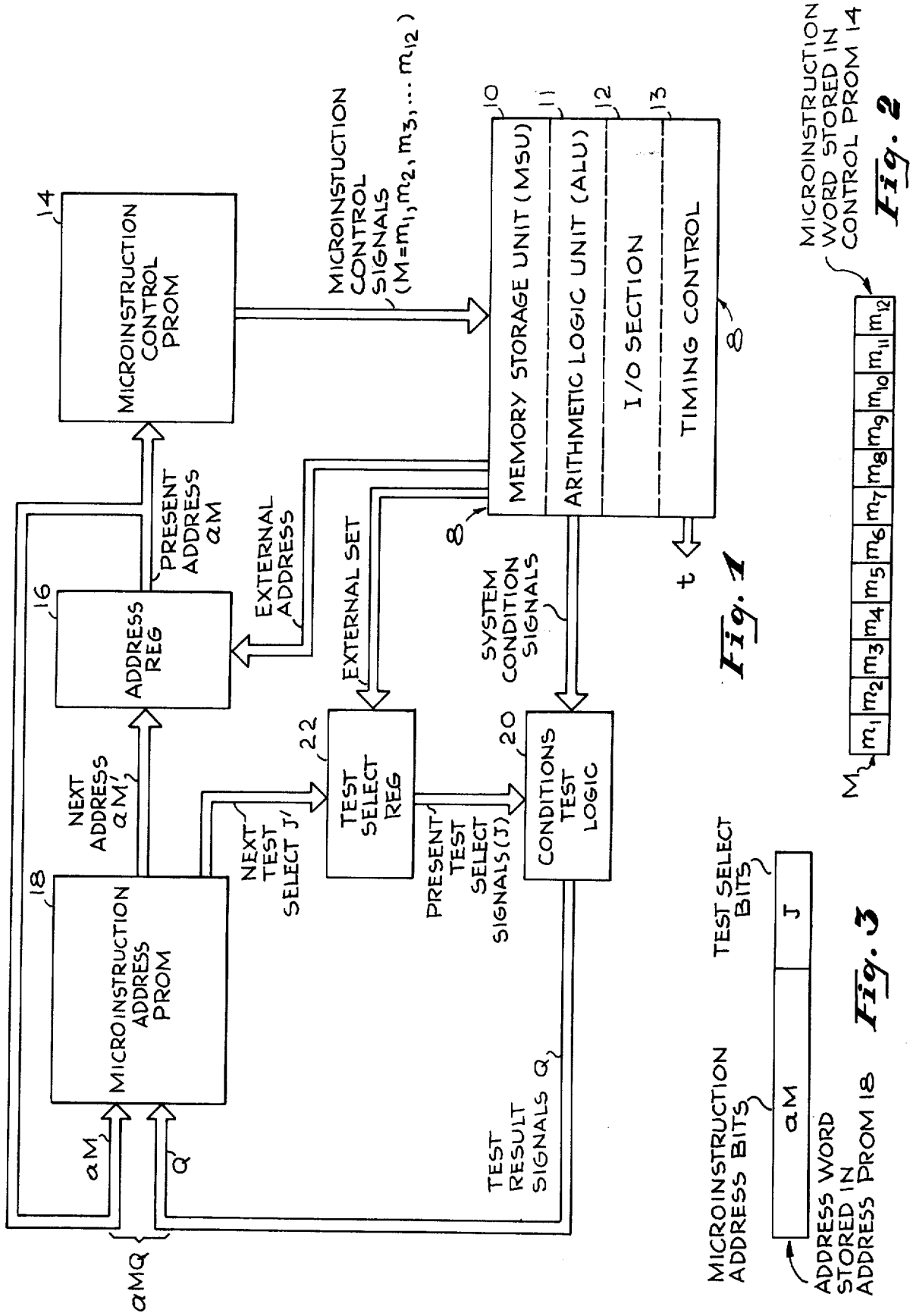

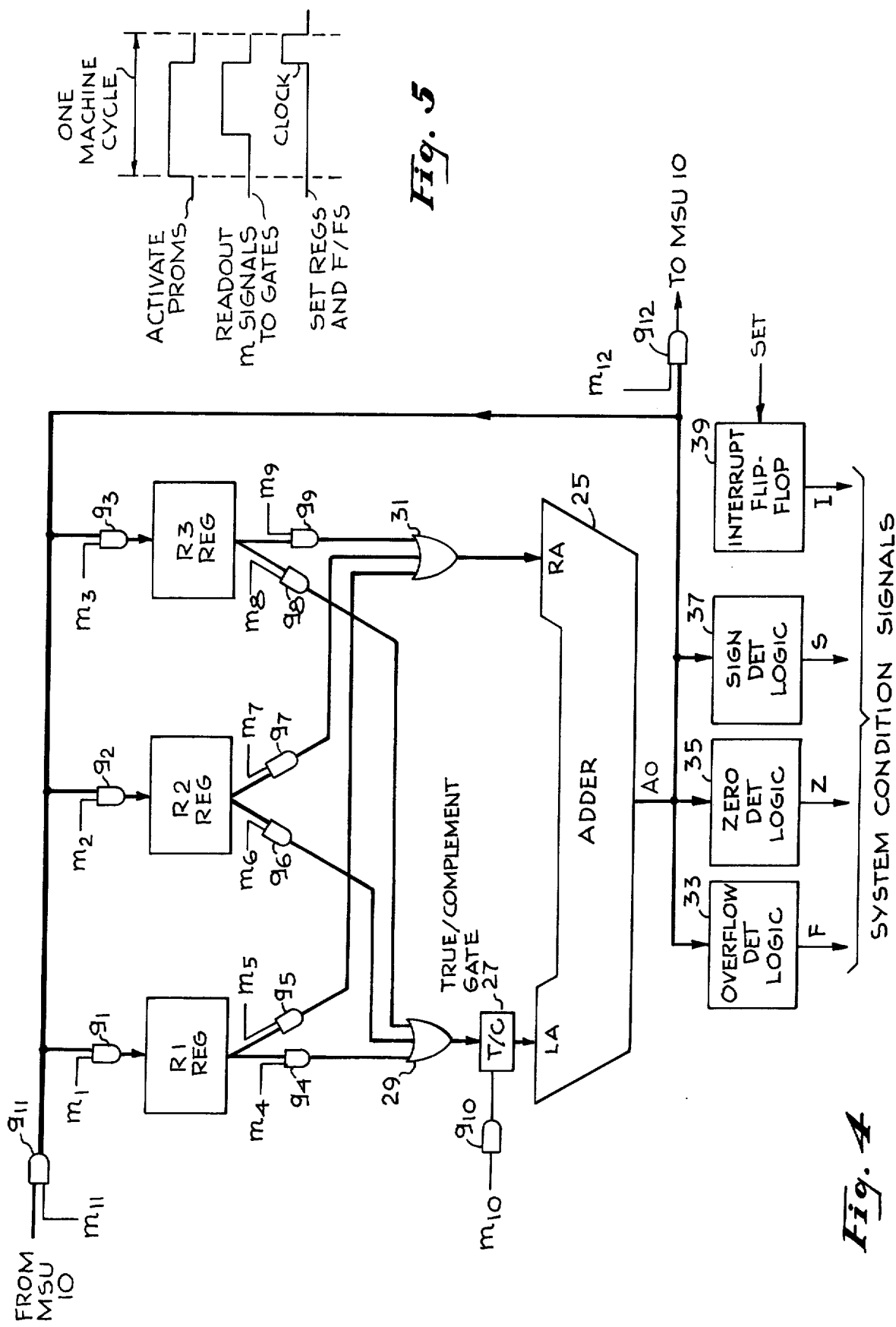

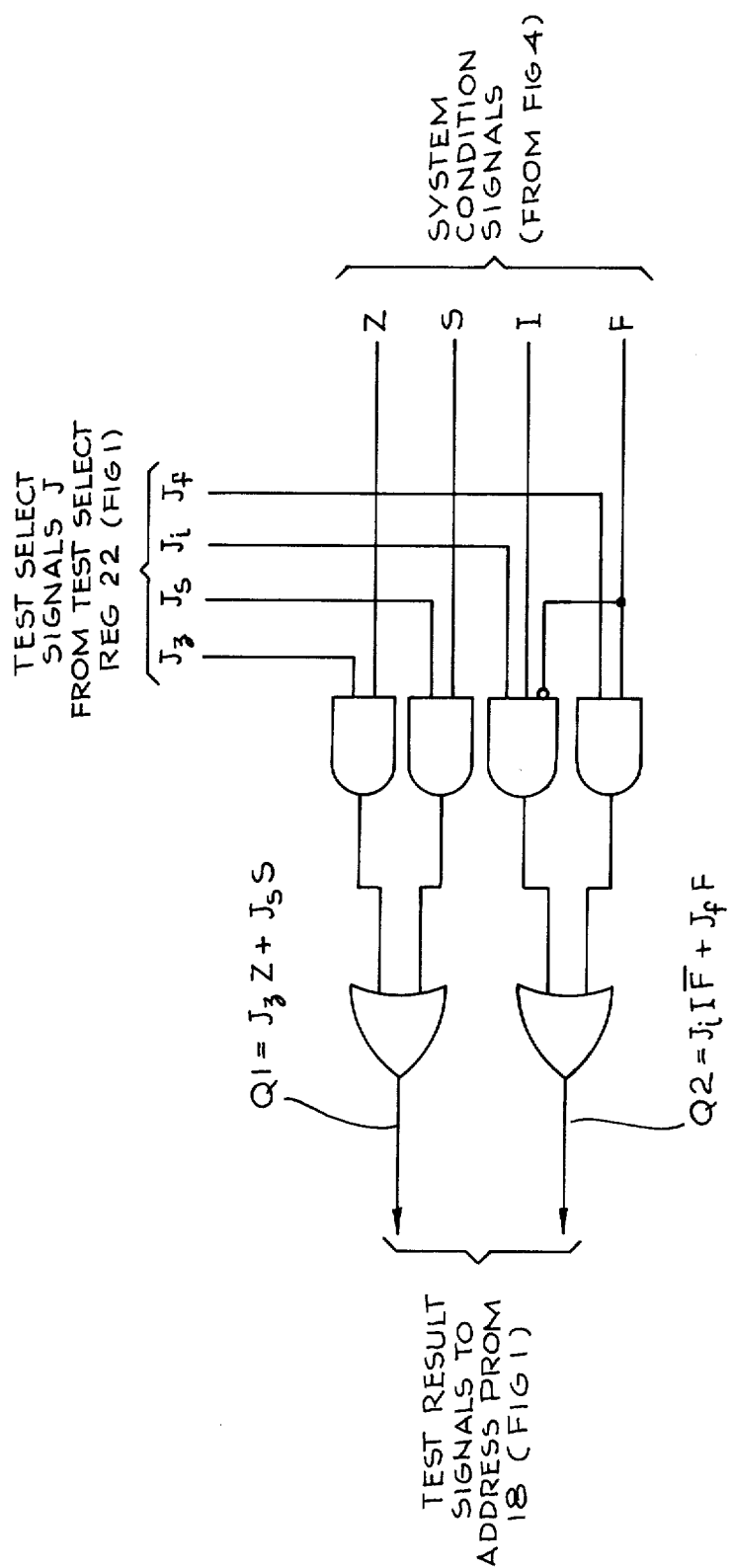

Fig. 8

X = "DON'T CARE"

| BLOCK No (FIG 6) | MICROINSTRUCTION ADDRESS IN ADDRESS REG 16 DURING CURRENT MACHINE CYCLE (aM) | TEST SELECT SIGNALS IN TEST SELECT REG 22 DURING CURRENT MACHINE CYCLE ($J_3$ $J_5$ $J_i$ $J_f$) | MICROINSTRUCTION SIGNALS READ FROM CONTROL PROM 14 DURING CURRENT MACHINE CYCLE ($m_1$ $m_2$ $m_3$ $m_4$ $m_5$ $m_6$ $m_7$ $m_8$ $m_9$ $m_{10}$ $m_{11}$ $m_{12}$) | POSSIBLE COMBINATIONS OF TEST RESULT SIGNALS PRODUCED BY CONDITIONS TEST LOGIC 20 DURING CURRENT MACHINE CYCLE ($Q_1$ $Q_2$) | CONTENTS OF ADDRESS WORDS (FIG 3) STORED IN ADDRESS PROM 18 AT EACH OF THE FOUR POSSIBLY ADDRESSABLE LOCATIONS DETERMINED BY CURRENT MACHINE CYCLE VALUES OF aM AND Q1 Q2 (aM'  J') |
|---|---|---|---|---|---|
| 51 | aM1 | J1   X X X X | M1   1 0 0 0 0 0 0 0 0 0 0 0   (MSU)A → R1 | 0 0<br>0 1<br>1 0<br>1 1 | aM2   X<br>aM2   X<br>aM2   X<br>aM2   X |
| 52 | aM2 | J2   X X X X | M2   0 1 0 0 0 0 0 0 0 0 0 0   (MSU)B → R2 | 0 0<br>0 1<br>1 0<br>1 1 | aM3   X<br>aM3   X<br>aM3   X<br>aM3   X |
| 53 | aM3 | J3   X X X X | M3   0 0 1 0 0 0 0 0 0 0 0 0   0 → R3 | 0 0<br>0 1<br>1 0<br>1 1 | aM4   J4<br>aM4   J4<br>aM4   J4<br>aM4   J4 |
| 54 | aM4 | J4   0 1 1 1 | M4   0 0 0 1 0 0 1 0 0 0 0 0   R2→LA, R3→RA, AO→R3 | 0 0<br>0 1<br>1 0<br>1 1 | aM5   J5<br>aM20   J20<br>aM6   J6<br>aM6   J6' |
| 55 | aM5 | J5   1 1 1 0 | M5   0 0 0 0 1 0 0 0 0 0 0 0   R1→RA, (−1)→LA, AO→R1 | 0 0<br>0 1<br>1 0<br>1 1 | aM4   J4<br>aM4   J4<br>aM6   J6<br>aM6   J6' |
| 56 | aM6 | J6   0 0 0 0 | M6   0 0 0 0 0 0 0 0 0 1 0 0   R3→RA, 0→LA, AO→MSU | 0 0<br>0 1 | aM10   J10<br>aM30   J30 |
| 57 |  | J6'   0 0 1 0 |  | 1 0<br>1 1 | X   X<br>X   X |

MICROPROGRAMMING CONTROL SYSTEM

BACKGROUND OF THE INVENTION

The present invention relates generally to improved means and methods for controlling the operation of digital computers. More particularly, the present invention is directed to improved means and methods for controlling the sequencing and branching of microinstructions in a microprogrammed digital computer.

A particular architectural concept that has allowed for more flexibility in computer design and also in computer programming has been the concept of microinstructions. Initially, a microinstruction was thought of as merely a set of control bits employed within a microinstruction format. Such control bits were employed to provide a corrective measure during the execution of a multiplying instruction of shift instruction and the like. Gradually, as the microprogramming concept enlarged, the macroinstruction specified the particular routine to be performed, such as the addition of two operands. The execution of the macroinstruction was then accomplished through a sequence of executions of microinstructions, each of which specified the particular gates to be set thereby. Since a plurality of macroinstructions could be implemented by a finite set of microinstructions, it was then apparent that these same microinstructions could be stored in a separate storage to be addressed in a particular sequence upon the execution of different macroinstructions. It was further recognized that various sequences of microinstructions could be formulated to carry out the particular operations and separately stored in any memory. Thus, a great variety of sequences of microinstructions could be created to carry out a great variety of routines, and when a given computer system was designed to perform particular routines, only those required sequences of microinstructions that would be stored could be called for to provide for execution of these particular routines.

The concept of microinstructions of microprograms, then, became one of providing sub-instructional sets which were masked or hidden from the programmer, thus, simplifying the writing of particular programs by minimizing the number of individual specific steps that had to be called for by the programmer. Furthermore, the concept of microprogramming allows the computer designer to design a more inexpensive computer system that could provide a great variety of routines to the computer user without the requirement of individual functions being implemented in hand-wired circuitry.

Microprogramming, then, can be broadly viewed as a technique for designing and implementing the control function of a digital computer system as sequences of control signals that are organized on a word basis and stored in a fixed or dynamically changeable control memory. Detailed examples of some known approaches to the design of microprogrammed digital computers can be found in the book by S.S. Husson, "Microprogramming: Principles and Practices", Prentice-Hall, Inc. (1970), the contents of which are to be regarded as incorporated herein by this reference.

As will be apparent from the referenced Husson book, a prior art microprogram control memory may typically comprise a selectively addressable control memory, usually of the read-only type, having microinstruction control words stored at selectable addressable locations thereof. Normally, microinstruction control words are accessed sequentially from the control memory. In order to provide for branching, each control word may typically include, in addition to the microinstruction bits, special next address bits and test select bits which are applied to branching logic along with system condition signals to determine the address of the next microinstruction.

Since a given microinstruction may be used in several different microroutines and with different associated next address and/or test select bits, it is usually necessary to provide sufficient storage in the control memory for storage of microinstructions at several different locations therein. In order to avoid increasing the size of the control memory as would be required by such replication, it has been proposed that a separate address memory be employed which contains sequences of microinstruction addresses for controlling the sequencing of microinstructions from a control memory in which each microinstruction is stored at only one location. (See A. Graselli, "The Design of Program-Modifiable Micro-Programmed Control Units," IRE Transactions on Electronic Computers, June 1962, pages 336–339). In such a system, branching is achieved through the utilization of tags stored along with the microinstruction addresses in the address memory which mark the beginning and the end of a microprogramming loop. When the address of the last microinstruction in a loop is accessed, the tag associated with this address will signal the system that, depending upon data and/or system status, the next address to be accessed from the address memory will be the address contained either in the next sequential word or address contained in the word which was tagged as being the beginning of the microprogramming loop.

It has also been recognized (see U.S. Pat. No. 3,794,979) that such a separate address memory as disclosed by the aforementioned Graselli article could be used to store additional control bits along with the microinstruction addresses in the address storage which permit selectively complementing and/or reversing a microinstruction accessed from the control memory before it is transmitted to a microinstruction storage data register, thereby permitting a reduction in the number of microinstructions required to be stored in the control memory.

The use of a separate address memory in the above described microprogramming approaches has made it possible to employ a control memory which has a storage capacity which is at least no greater than that required to store each different microinstruction without any repetitions, and without the need for any additionally provided next address or test select bits. However, this advantage has been achieved in the above approaches at the expense of increased complexity in the branching and conversion logic required to be provided, while also making the generation of suitable microprogramming more difficult and less flexible.

SUMMARY OF THE INVENTION

The present invention is directed to improved means and methods for controlling a microprogrammed digital computer which, similarly to the approaches considered above, likewise makes use of a separate address memory to permit the size of the control memory to be reduced to that required for storing the microinstructions without repetition. However, the present invention employs this separate address memory in a distinctly different manner which significantly reduces the branching logic required while providing a greater branching flexibility as well as less restrictive microprogramming requirements.

Basically, the above advantages are achieved in a preferred embodiment of the invention by organizing and mapping microinstruction addresses in the address memory in a manner so that it not only stores the microinstruction addresses required for addressing microinstructions in the control memory, but also, so that the address memory, in effect, additionally serves to perform a significant portion of the required branching logic, thereby significantly reducing the complexity of the external branching logic which would otherwise be required. In order to achieve this capability, the storage capacity of the address memory is made sufficiently large to provide for an address mapping and organization thereof in accordance with the invention which permits it to internally perform branching logic. However, since the address memory need only store microinstruction address bits, and preferably also the associated test select bits of the corresponding microinstruction stored in the control memory, the increased size of the address memory is more than offset by the advantages gained as a result of the branching logic capability provided thereby in accordance with the present invention, particularly in view of recent advances in large scale integrated circuit techniques which have resulted in making programmable read only memories readily available at reasonable cost.

In a particular preferred form of the invention, a control memory and an address memory are each separately provided as a programmable read only memory (PROM). The Address PROM stores microninstruction addresses along with corresponding test select bits, while the Control PROM stores the microinstructions without repetition. The size of the Address PROM is chosen to provide for storage of a multiple of the number of microinstructions contained in the Control PROM depending upon the branching capability desired.

In this preferred embodiment, the same address register containing the microinstruction address which is used to address the Control PROM in a current machine cycle is also advantageously used to provide a portion of the address required for addressing the Address PROM in the current machine cycle. The remaining portion of the address required for addressing the Address PROM in the current machine cycle is provided by test result signals derived by testing particular system condition signals selected for testing during the current machine cycle. This selection is determined by the test select bits read out from the address PROM and set up in a test select register during the previous machine cycle at the same time that the associated microinstruction address read out from the Address PROM was being set up in the address register during the previous machine cycle. The address register portion of the Address PROM address may thus be considered to specify a predetermined number of possible storage locations in the Address PROM containing next microinstruction addresses for use in the next machine cycle, the choice therebetween being determined by the results of testing selected system conditions.

The manner in which the mapping of microinstruction addresses in the Address PROM is chosen in a preferred embodiment of the invention using the above described basis for determining the next address for the Address PROM will now be briefly summarized. If the next microinstruction is an unconditional one (that is, no branching is required), then the address of this next following unconditional microinstruction is stored in all possible next address locations of the address PROM specified by the current microinstruction address in the address register. In such a case, the portion of the next address for the Address PROM derived from testing system conditions is not needed to determine the next microinstruction, and thus provides a "don't care" result. If, on the other hand, the next microinstruction may be any one of a plurality of different microinstructions (that is, a branching possibility exists), then the corresponding microinstruction address of each of these possible next microinstructions is stored at a respective one of the various possible next address locations of the Address PROM specified by the current microinstruction address in the address register, and provision is made to select the appropriate next address location in the Address PROM based upon the address portion derived as a result of testing the selected system conditions chosen by the test select signals in the test select register. Thus, a significant portion of the logic required for controlling the sequencing of microinstructions, including the provision of appropriate looping and branching as required to perform a particular microroutine or macroinstruction, is determined by the particular mapping of microinstruction addresses provided in the Address PROM.

The specific nature of the invention as well as other objects, features, advantages and uses thereof will become evident from the following more detailed description of the invention taken in conjunction with the accompanying drawings.

BRIEF DESCRIPTION OF THE DRAWINGS

FIG. 1 is an overall block diagram generally illustrating a digital data processing system employing microprogramming control means in accordance with the present invention.

FIG. 2 illustrates the format of each of the microinstuction address words stored in the Control PROM of FIG. 1.

FIG. 3 illustrates the format of each of the microinstruction control words stored in the Address PROM of FIG. 1.

FIG. 4 is an electrical circuit diagram illustrating a pertinent portion of an arithmetic logic unit for use in describing the present invention.

FIG. 5 illustrates typical time relationships which may be provided for the various operations performed during a machine cycle in the system of FIG. 1.

FIG. 7 is an electrical circuit diagram illustrating an example of how the conditions test logic of FIG. 1 may typically be implemented for use in performing the MULTIPLY microroutine of FIG. 6.

FIG. 8 is a table providing details illustrating the operation of the system of FIG. 1 during performance of the MULTIPLY microroutine of FIG. 6.

DETAILED DESCRIPTION OF THE INVENTION

Figure 6:
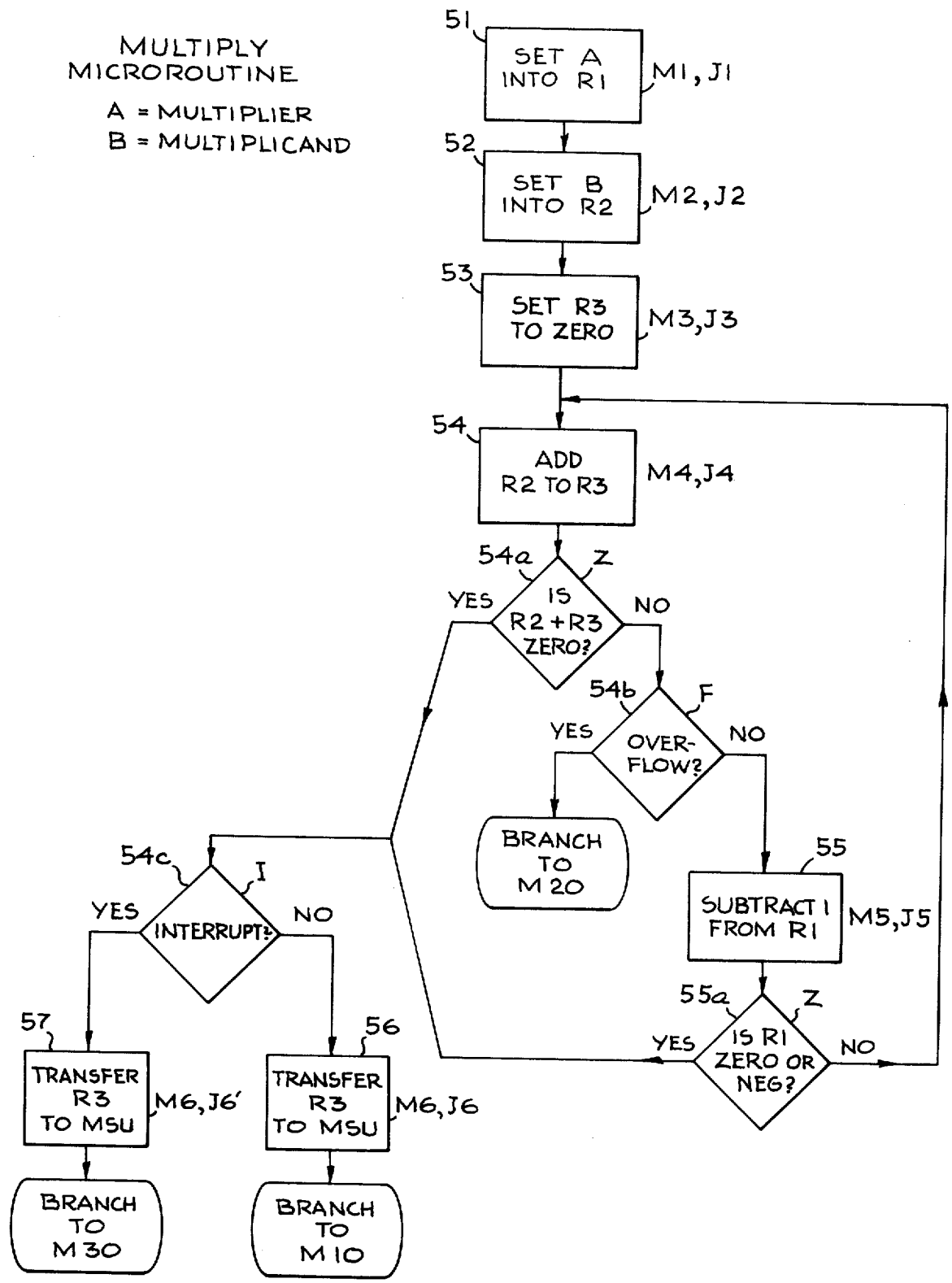
FIG. 6 is a flow chart illustrating an example of how a MULTIPLY microroutine can be performed using the microprogramming control means of the present invention.

Like numerals and characters represent like elements throughout the figures of the drawings.

Reference is initially directed to FIG. 1 which generally illustrates a digital data processing system employing microprogramming control means in accordance with the present invention. For the sake of simplicity, block 8 in FIG. 1 is provided to represent conventional portions of a digital data processing system including a memory storage unit (MSU) 10, an arithmetic logic unit (ALU) 11, an Input/Output Section 12, and a timing control 13, each of which may be provided in any of a variety of well known forms presently available in the art. The remainder of FIG. 1 corresponds to the control portion of a digital data processing system and, in particular, illustrates the basic elements of a preferred embodiment of microprogramming control means in accordance with the present invention.

A microinstruction Control PROM 14 in FIG. 1 is provided to store a plurality of microinstructions, preferably without any repetition. The format of a typical microinstruction stored in the Control PROM 14 is illustrated in FIG. 2 and comprises microinstruction bits $m_1, m_2, m_3, \ldots m_{12}$. A selected microinstruction is read out from the Control PROM 14 in a conventional manner in response to a microinstruction address aM contained in an address register 16. The microinstruction read out from the Control PROM 14 typically comprises microinstruction control signals $m_1, m_2, m_3, \ldots m_{12}$ which control corresponding gates in the data processor in a conventional manner, such as typically illustrated in FIG. 4 for the ALU portion shown.

A microinstruction Address PROM 18 is also provided in the system of FIG. 1 for storing address words having the format typically illustrated in FIG. 3. As illustrated in FIG. 3, each word stored in the Address PROM 18 includes microinstruction address bits aM representative of the address of a particular microninstruction in the Control PROM 14, and test select bits J which determine the particular system condition signals selected for testing by conditions test logic 20. For reasons which were briefly explained earlier, and which will become more apparent hereinafter, the Address PROM 18 in the preferred embodiment of the invention being described herein provides storage for a predetermined multiple of the number of microinstructions contained in the Control PROM 14. The particular multiple is determined by the number of Q signals provided by the test conditions logic 20, since the Q signals along with the microinstuction address aM together provide the total address required for addressing the Address PROM 18. Thus, if, for example, 64 microinstructions are stored in the Control PROM 14 and there is one Q output signal provided, then the Address PROM 18 is preferably chosen to provide storage for 128 microinstruction addresses and associated test select bits. If two Q output signals are provided, then the Address PROM 18 is preferably chosen to provide storage for 256 microinstruction addresses and associated test select bits.

Although the Control PROM 14 and the Address PROM 18 are illustrated in the preferred embodiment of FIG. 1 as being programmable read-only memories, it is to be understood that the present invention also contemplates the use of other types of memories for these purposes.

The starting address of the initial microinstruction of a particular microroutine or macrooperation in the system of FIG. 1 may be obtained in a conventional manner by decoding the operator portion of a macroinstruction accessed from the MSU 10 to provide an external or starting microinstruction address to the address register 16. This decodng operation may itself be performed by one or more microinstructions. The test select register 22 in FIG. 1 may also be set to an initial setting at this time.

Before describing the operation of FIG. 1, reference will first be made to FIG. 5 to briefly consider timing relationships. Although timing may be provided in a variety of known ways for a microprogrammed digital data processing system in accordance with the invention, it will be assumed for illustrative purposes that timing within the data processing system illustrated in FIG. 1 is synchronous with one microinstruction being performed during each machine cycle. It will also be assumed for illustrative purposes that the Control PROM 14 and Address PROM 18 as well as other logic in the system, including the conditions test logic 20, are of the dynamic type, and that all registers and flip-flops are set at the same time by a common clock signal occurring at the end of each machine cycle, as indicated by the bottom graph in FIG. 5.

As will be evident from the top graph of FIG. 5, the Control PROM 14 and Address PROM 18 in FIG. 1 are activated at the beginning of a machine cycle and remain activated to provide their respective output signals until occurrence of the clock pulse at the end of the machine cycle. As shown by the middle graph in FIG. 5, the particular microinstruction control signals selected by the address register 16 are available shortly after the PROMs are activated to appropriately control their respective gates for performance of the selected microinstruction. The operating speed of the dynamic logic in the system is such that valid results of the logical operations occurring during each machine cycle are present at the inputs to the registers and flip-flops prior to the time that the clock pulse occurs at the end of the machine cycle. It is to be understood that the timing control 13 illustrated in FIG. 1 provides appropriate timing signals $t$ in a conventional manner to the Control PROM 14 and Address PROM 18 as well as to the various registers, flip-flops and other circuits in the data processor to provide appropriate timing therefor in accordance with FIG. 5. In order not to confuse the drawings the particular signals fed to these various elements will not be shown in the drawings, but are to be assumed as provided where appropriate.

The overall operation of the digital data processing system illustrated in FIG. 1, and incorporating microprogramming control means in accordance with the invention, will now be described. It will be assumed that a starting microinstruction address of a microroutine has been set up in the address register 16 in response to the clock pulse at the end of the immediately preceding machine cycle. The test select register 22 may likewise be set to initial values at the same time. When the Control PROM 14 is activated at the beginning of the current machine cycle, as illustrated in FIG. 5, the starting microinstruction address aM in the address register 16 addresses the corresponding starting microinstruction in the Control PROM 14, which in turn provides corresponding microinstruction control signals $m_1, m_2, m_3$, etc. to the gates of the system a short time later in the current machine cycle, as illustrated by the middle graph of FIG. 5. The ALU portion of FIG. 4 illustrates how microinstruction control signals $m_1, m_2, m_3, \ldots m_{12}$ may typically be applied to respective gates $g_1, g_2, g_3, \ldots g_{12}$. For the purposes of this description, it will be assumed that each of the bits $m_1, m_2, m_3$, etc. of a microinstruction word stored in the Control PROM 14 is read out as a 0 or 1 on a respective output line. However, it is to be understood that the present invention is not limited to such an arrangement, but also contemplates an encoded arrangement of microinstruction bits, such as described in the aforementioned Husson reference, whereby the number of bits required to be stored in the Control PROM 14 for each microinstruction may be significantly reduced.

During the machine cycle, the conditions test logic 20 in FIG. 1 operates to test the particular system condition signals selected by the test select signals J in the test select register 22 to produce test result signals Q. Each system condition signal may indicate a result derived from performing the current microinstruction and/or may be indicative of a system status condition such as "interrupt" or "error." As shown in FIG. 1, the test result signals Q produced by the conditions test logic 20 during each cycle are applied to the Address PROM 18 as a portion of the total address applied thereto during each machine cycle, the other address portion being the present address aM in the address register 16.

Although not necessary for the purposes of the present description, it is assumed that the Address PROM 18 in FIG. 1 is activated at the beginning of each machine cycle along with the Control PROM 14, as indicated in the top graph in FIG. 5. Since the Address PROM 18 requires valid Q signals as well as the microinstruction address aM in the address register 16 for addressing purposes, the output of the Address PROM 18 will not be valid until the test result signals Q are valid. This is not of significance, since the system design is chosen for the particular preferred embodiment being considered herein so that the operating speed of the PROMs 14 and 18 and the speed of performance of logical operations during each machine cycle is such that the input signals to all flip-flops and registers, including the inputs to the address register 16 and test select register 22 read out from the Address PROM 18, are all valid by the time that the clock signal occurs at the end of each machine cycle.

It will thus now be evident with respect to the operation of FIG. 1 that the ocurrence of the clock signal at the end of each machine cycle will cause the next microinstruction address aM' in the selected Address PROM word (FIG. 3) addressed by the present aM and Q of the current machine cycle to be set into the address register 16, and the associated test select bits J (FIG. 3) read out therewith to be set into the test select register 22. Operations during each successive machine cycle will then be as described above for the starting microinstruction. In order to provide for the performance of a particular macroinstruction or microroutine in the preferred embodiment of FIG. 1 using the principles of the present invention, the multiple storage locations provided in the Address PROM 18 are mapped taking into account the address portions aM and Q provided by the address register 16 and the conditions test logic 20, respectively, so as to produce the particular microinstruction sequencing required during successive machine cycles to perform the desired macroinstruction or microroutine. The specific manner in which performance of a macroinstruction or microroutine may be accomplished in accordance with the invention will be considered in detail by using, as an example, the MULTIPLY microroutine illustrated by the flow chart of FIG. 6.

Preparatory to the description of this MULTIPLY microroutine, reference is directed to FIG. 4 which illustrates details of a typical implementation of the pertinent portion of the ALU 11 involved in this example. Various simplified representations have been employed in FIG. 4 for greater clarity. Each double width line in FIG. 4 is representative of a plurality of lines, while each normal width line is representative of a single line. Also, each of the gates in FIG. 4 having such a double width line applied thereto is to be considered as constituting a group of similarly controlled like gates of sufficient number to accommodate the plurality of lines contained in the applied double width line.

FIG. 4 will be seen to include: three registers R1, R2 and R3; a dynamic adder 25 having left and right inputs designed as LA and RA and an adder output designated as AO; OR gates 29 and true/complement gates 27 in series with the left input LA to the adder 25; OR gates 31 in series with the right input RA to the adder 25; AND gates $g_1 - g_{12}$ responsive to respective ones of the microinstruction control signals $m_1 - m_{12}$ and located so as to control the inputing and outputing of data to and from respective ones of the registers R1, R2 and R3, the adder 25 and the MSU 10; condition indicating circuitry connected to the adder output AO comprising overflow detection logic 33, zero detection logic 33, and sign detection logic 35 for providing system condition signals F, Z and S, respectively; and interrupt flip-flop 39 for providing system condition signal I.

As will be evident from an examination of FIG. 4, AND gates $g_1$, $g_2$ and $g_3$ operate in conjunction with respective microinstruction signals $m_1$, $m_2$ and $m_3$ to control the flow of data from the adder output AO into the R1, R2 and R3 registers, respectively; AND gates $g_4 - g_9$ operate in conjunction with respective microinstructions signals $m_4 - m_9$ to control the data flow out of the R1, R2 and R3 registers for application to either the left or right side LA or RA of the adder 25 via OR gates 29 or 31; AND gate $g_{10}$ operates in conjunction with microinstruction signal $m_{10}$ to control the operation of the true/complement gate 27; and AND gates $g_{11}$ and $g_{12}$ operate in conjunction with respective microinstruction signals $m_{11}$ and $m_{12}$ to control the flow of data to and from the MSU 10.

Referring next to FIG. 6, illustrated therein is a flow chart showing how a MULTIPLY microroutine may typically be performed using the embodiment of the invention illustrated in FIGS. 1 and 4. Each "Block" in FIG. 6 corresponds to a single machine cycle and summarizes the operations performed by a particular microinstruction read out from the Control PROM 14 during that machine cycle, the particular microinstruction performed being indicated by a respective one of the microinstruction designations M1, M2, etc., and the particular associated test select signals provided during the machine cycle being indicated by a respective one of the J designations J1, J2, etc. The specific contents of these M and J designations are provided by the table of FIG. 8.

A "Diamond" in the flow chart of FIG. 6 is provided to indicate the effect on microinstruction sequencing produced as a result of testing a particular system test condition during the machine cycle summarized in the immediately preceding block, the particular system condition tested by a "Diamond" being indicated by the provision in FIG. 6 of a respective designation corresponding to one of the system condition signals F, Z, S or I provided by the ALU portion of FIG. 4.

FIG. 7 illustrates a simplified example for explanatory purposes of a logical circuit implementation which may be incorporated in the conditions test logic 20 in FIG. 1 for providing appropriate test result signals Q1 and Q2 to the Address PROM 18 during each machine cycle in response to system condition signals F, Z, S and I obtained from the ALU portion of FIG. 4, in order to provide for performance of the MULTIPLY microroutine of FIG. 6. As shown in FIG. 7, relatively simple selection logic is provided comprised of AND gates 37-40 to which the test signal signals $J_z$, $J_s$, $J_i$ and $J_f$ and the system condition signals Z, S, I and F are appropriately applied, and OR gates 42 and 43 for receiving the outputs of AND gates 36, 37, 38 and AND gates 39, 40, respectively. The resulting logical equations for Q1 and Q2 provided at the outputs of OR gates 42 and 43 are thus: $Q1 = J_zZ + J_sS$ and $Q2 = J_i\overline{IF} + J_f\overline{FI}$.

FIG. 8 illustrates, for each of Blocks 51-57 involved in the performance of the MULTIPLY microroutine of FIG. 6, the current microinstruction address aM contained in the address register 16 during the machine cycle, the values of the test select signals $J_z$, $J_s$, $J_i$ and $J_f$ provided by the test select register 22 during the machine cycle, the values of the microinstruction control signals $m_1 - m_{12}$ read out from the Control PROM 14 during the current machine cycle in response to the current microinstruction address aM along with a brief symbolic summary of the operations performed thereby during the machine cycle, the four possible combinations of the test result signals Q1 and Q2 which may be produced by the conditions test logic 20 during the current machine cycle, and the next microinstruction aM' and test select bits J' stored at each of the four possibly addressable locations in the Address PROM 18 which may be addressed during the current machine cycle in response to the current microinstruction address aM and the four possible combinations of the test result signals Q1 and Q2.

It will be assumed for the MULTIPLY microroutine illustrated in FIG. 6 that 64 microinstructions M1 through M64 are stored in the Control Memory 14 without replication, in which case the address register 16 will provide for storage of a six-bit microinstruction address aM in order to permit addressing any selected one of these 64 microinstuctions. Since two test result signals Q1 and Q2 are provided for addressing the Address PROM 18 along with the microinstruction address aM, the Address PROM 18 is designed in this preferred embodiment to provide for storage of 256 microinstruction addresses and associated test select bits, or four times the number of microinstructions contained in the Control PROM 14. Thus, as indicated in FIG. 8, any one of four possible storage locations may be selected in the Address PROM 18 during each machine cycle in response to the present microinstruction address aM in the address register 16 and the four possible combinations of the test result signals Q1 and Q2. It will accordingly be understood that, since the same or one or more different microinstruction addresses and associated test select bits may be stored in these four possible Address PROM storage locations, and further, since the microinstruction address of any desired one of the 64 available microinstructions in the Control PROM 14 along with any desired values of associated test select bits may be chosen for storage in each of these four possibly addressable Address PROM storage locations, a highly flexible microinstruction addressing and branching capability is provided without requiring the provision of any of the address modification logic and/or special branching logic normally provided in known microprogramming approaches.

Before considering the specific manner in which the detailed operations and tests provided by each of the "Blocks" and "Diamonds" illustrated in the flow chart of FIG. 6 may be performed in accordance with the invention, the overall approach and basic operation will first be briefly summarized. Initially, the multiplier A obtained from MSU 10 is set up in register R1 (Block 51), the multiplicand B also obtained from MSU 10 is set up in register R2 (Block 52), and register R3 (which serves as an accumulator) is set to zero (Block 53). For simplicity, it is assumed that A and B are positive fixed-point integers. The basic approach employed for providing multiplication is to successively add the multiplicand in register R2 to the accumulated total in register R3 (Block 55) the number of times indicated by the multiplier in register R1 which is determind by subtracting 1 from the multiplier in register R1 (Block 55) after each addition, the flow looping back to Block 54 until the value in R1 is reduced to zero.

During Block 54, a number of tests are made as indicated by Diamonds 54a, 54b and 54c in order to determine which of four possible branches the flow should take. First the sum R2 + R3 provided during Block 54 is tested for zero (Diamond 54a). If R2 + R3 is zero it indicates that the multiplicand B is zero, in which case the product AB is already known to be zero, and the flow accordingly proceeds to either Block 56 or 57 depending upon the results of an interrupt condition test (Diamond 54c). As will become more evident during the detailed consideration of FIG. 6 to be provided shortly, the two alternative Blocks 56 and 57 are provided for transferring the product in R3 to the MSU 10 in order to permit selection of one of two different branches M10 or M30, dependent upon the results of the previous interrupt condition test (Diamond 54c).

If, on the other hand, R2 + R3 is not found to be zero (Diamond 54a), then the R2 + R3 sum produced during Block 54 is tested for overflow (Diamond 54b) which causes the flow to either branch to M20 to handle the overflow condition in some apropriate manner, or to proceed to Block 55 to continue with the multiplication operation by subtractng 1 from the multiplier in register R1 and then looping back to Block 54 if the multiplier has not been reduced to zero. The zero condition of R1 is tested during Block 55, as indicated by Diamond 55a which also provides for testing whether R1 is negative. This additional negative testing in Diamond 55a is provided to permit the multiplication operation to directy branch to Blocks 56 or 57 in the event the multiplier set into R1 is zero, in which case the product is known to be zero. It will be remembered that a like situation also occurs in the event the multiplicand set into R2 is zero, as previously considered in connection with Block 54. Thus, if the multiplier R1 is zero, the subtraction of 1 therefrom in Block 55 makes R1 negative, and the testing of this negative condition as indicated by Diamond 55a causes the flow to proceed directly to interrupt condition testing in Diamond 54c without looping back to Block 54. If the multiplier set into R1 is not zero, the zero condition testing of R1 − 1 in Diamond 55a causes the flow to loop back to Block 54 until an R1 − 1 = 0 condition occurs during Block 55, which indicates that the multiplication operation has been completed and that the product AB isnow contained in R3. The interrupt testing provided in Diamond 54c and the operation provided in Blocks 56 and 57 are the same as previously described in connection with the flow thereto from Block 54.

The specific manner in which the MULTIPLY microroutine illustrated by the flow chart of FIG. 6 may be performed in accordance with the invention using the illustrative implementations of FIGS. 4 and 7 will now be considered in detail, with particular reference to the table of FIG. 8. It will be assumed that the first microinstruction address $aM1$ of this MULTIPLY microroutine has been set up in the address register 16 during the previous machine cycle. The manner in which sequencing is provided from Block 51 to Block 54 will first be considered.

As indicated in FIG. 8, because sequencing from each of the first three blocks 51, 52 and 53 to the next following block is unconditional, that is, no branching is required, the respective microinstruction address $aM'$ required for the next following block is stored along with respective J' bits in all of the four possibly addressable storage locations in the Address PROM 18 which may be addressed during performance of the machine cycle corresponding to each of these Blocks 51, 52 and 53. For example, all four possibly addressable storage locations for Block 52 have the microinstruction address aM2 stored therein, so that the microinstruction M2 is necessarily performed during the next machine cycle, as required for Block 52. The particular values produced for the test result signals Q1 and Q2 during each of these first three Blocks 51, 52 and 53 are thus of no significance, since the same next microinstruction address $aM'$ wll be read out from the Address PROM 18 for use in the next machine cycle regardless of which of the four possible storage locations specified by the current address $aM$ and the values of Q1 and Q2 is addressed. The bit values of the test select signals J1, J2 and J3 respectively provided durng each of these first three Blocks 51, 52 and 53 are likewise of no significance, and are accordingly indicated as "dont't care" values in the table of FIG. 8 by the use of an $x$ designation for each bit thereof.

From the above description some important features of the invention should be evident. First, it will be apparent that, in the preferred embodiment of the invention being described herein, it is not necessary to provide any particular values for the test signals J required for a block when sequencing to the next block is unconditional, that is, when no branching possibility exists. Furthermore, when no branching possibility exists, selection of the next microinstruction to be performed does not require the performance of any logic whatsoever external to the Address PROM 18, not even count-up logic, since the current microinstruction address $aM$ in the address register 16 at the start of the machine cycle has already determined the four possibly addressable locations in the Address PROM 18, and all of these contain the identical next microinstruction address $aM'$ of the microinstruction required for the next block. Still further, it is to be noted that there is no need to restrict the choice of this next microinstruction to any particular microinstruction in the Control PROM 14, such as the next consecutive microinstruction obtained using count-up logic, or a microinstruction derivable using available address modification logic, as is typically done in known systems. Rather, any desired one of the microinstructions contained in the Control PROM 14 can be selected for the next microinstruction in accordance with the invention simply by inserting the corresponding next microinstruction address $aM'$ in each of the possibly addressable storage locations of the Address PROM 18 which may be addressed during the current machine cycle.

Having described how sequencing is provided from Blocks 51 to 54 in accordance with the invention, the manner in which the operations required to be performed in each of these blocks are carried out in response to the respectively selected microinstructions M1, M2, M3 and M4 will next be considered with continuing reference to the table of FIG. 8 which illustrates the particular values of the microinstruction control signals $m_2-m$ read out from the Control PROM 14 for the microinstruction selected for each block. It will be evident from the table of FIG. 8 that the microinstruction M1 read out from the Control PROM 14 during Block 51 has 1 values only for microinstruction signals $m_1$ and $m_{11}$, which results in enabling respective AND gates $g_1$ and $g_{11}$ during the machine cycle to cause the multiplier A provided from the MSU 10 to pass to the input of register R1 for setting therein when the clock pulse (FIG. 5) occurs at the end of the Block 51 machine cycle. As explained in the previous discussion, and as also shown in the table of FIG. 8, the next microinstruction selected is necessarily M2, as required for the performance of Block 52 in FIG. 6, regardless of the values of the test result signals Q1 and Q2, since the microinstruction address aM2 of microinstruction M2 is stored in each of the four possibly addressable storage locations in the Address PROM 18 which can be addressed during Block 51 in response to the current microinstruction address aM1 in the address register 16.

During the performance of Block 52 in FIG. 6, microinstruction M2 is read out from the Control PROM 14 for which only microinstruction signals $m_2$ and $m_{12}$ now have 1 values as shown in the table of FIG. 8, thereby enabling respective AND gates $g_2$ and $g_{12}$ in FIG. 4 to cause the multiplier B to be applied therethrough to the input of the R2 register in FIG. 4 for setting therein when the clock pulse occurs at the end of the Block 52 machine cycle. Since all four possibly addressable locations of the Address PROM 18 in the Block 52 machine cycle contain the microinstruction address aM3, the next microinstruction selected is necessarily M3, as required for the performance of Block 53 in FIG. 6 during the next machine cycle.

It will be seen from the table of FIG. 8 that, during Block 53 in FIG. 6 microinstruction M3 is read out from the Control PROM 14 for which only $m_3$ is 1 to provide for applying a zero input to register R3, which will reslt in R3 being set to zero when the clock pulse occurs at the end of the Block 53 machine cycle. Since all of the possibly addressable locations of the Address PROM 18 for the Block 53 machine cycle contain miroinstruction address aM4, the flow proceeds to Block 54 in FIG. 6 for performance of microinstruction M4.

Microinstruction M4 performed in Block 54 provides for the addition of R2 and R3 using the adder 25. This is accomplished by microinstruction M4 as a result of only microinstruction signals $m_3$, $m_6$ and $m_9$ having 1 values, as shown in FIG. 8, so as to enable respective AND gates $g_3$, $g_6$ and $g_9$ in FIG. 4 to cause R2 to be applied to the left input LA of adder 25, R3 to be applied to the right input RA of adder 25, and the resulting adder output AO constituting the sum of R2 and R3 to be applied to R3 to be set up therein when the clock pulse occurs at the end of the Block 54 machine cycle.

As previously considered herein when the flow chart of FIG. 6 was briefly summarized, the flow may branch from Block 54 to any one of the three blocks 55, 56 or 57 or to the starting microinstruction M20 of the OVERFLOW routine, depending upon the results of the system condition tests indicated in FIG. 6 by Diamonds 54a, 54b and 54c, respectively. With reference to FIG. 4, it will be understood that overflow detection logic 33, zero detection logic 35 and sign detection logic 37 to which the adder output AO is applied serve to respectively test the adder output AO for zero, overflow and sign to provide respective output signals F, Z and S, while the respective interrupt condition signal I is provided by an interrupt flip-flop 39 which may be set by the system in a conventional manner. All of thse system condition signals Z, S, I and F are applied to the conditions test logic 20 in FIG. 7 for testing as determined by the values of the test select signals J provided during each machine cycle. As illustrated in FIG. 8, the J4 signals provided from the test select register 22 (FIG. 1) during the Block 54 machine cycle have a 1 value for $J_z$, $J_i$, and $J_f$ and a 0 value for $J_s$, indicating that the Z, F and I system conditions are to be tested during Block 54, as indicated by respective Diagonals 54a, 54b and 54c in FIG. 6. The resulting outputs of Q1 and Q2 are in conformance with the equations shown in FIG. 7.

FIG. 8 illustrates the four possible combinations of Q1Q2, namely 00; 01; 10 and 11 which may occur during each machine cycle. As mentioned previously, because no branching is required to be provided from Blocks 51, 52 and 53, the particular values of Q1 and Q2 are of no significance during Blocks 51, 52 and 53 since the next microinstruction address aM' required for the next block is stored in all possibly addressable locations of the Address PROM 18 which may be addressed by the current address aM and the resulting values of Q1 and Q2. However, unlike Blocks 51, 52 and 53 in Block 54, the flow may take any one of four branches as illustrated in FIG. 6. Thus, in accordance with the invention, and as illustrated in FIG. 8 for Block 54, the appropriate next microinstruction address aM' along with appropriate test select bits J' for each of the four possible branches is stored in a respective storage location of the Address PROM 18, as determined by the corresponding values of Q1 and Q2 produced during the Block 54 machine cycle. Thus, in accordance with the equations for Q1 and Q2 set forth in FIG. 7, and as illustrated in FIG. 8, the result Q1Q2 = 00 will be obtained in Block 54 when R2 + R3 ≠ 0 (i.e. Z = 0) and there is no overflow (i.e. F = 0), in which case the next microinstruction address aM' stored in the aM400 location of the Address PROM 18 is aM5 along with test select bits J5, as required for the flow to proceed to Block 55 for the performance of microinstruction M5. The result Q1Q2 = 01 will be obtained in Block 54 when R2 + R3 ≠ 0 (i.e. Z = 9) and there is an overflow (i.e. F = 1), in which case the next microinstruction address aM' stored in the aM401 location of the Address PROM 18 is a aM20 along with test select bits J20, as required for the flow to proceed to the starting microinstruction M20 of the OVERFLOW microroutine. The result Q1Q2 = 10 will be obtained in Block 54 when R2 + R3 = 0 (i.e. Z = 1) and there is no interrupt (i.e. I = 0), in which case the next microinstruction address aM' stored in the aM410 location of the Address PROM 18 is aM6 along with test select bits J6. Finally, the result Q1Q2 = 11 will be obtained in Block 54 when R2 + R3 = 9 (i.e. Z = 1) and there is an interrupt (i.e. I = 1), in which case the next microinstruction address aM' stored in the aM411 location of the Address PROM 18 is aM6 along with test select bits J6'.

The above example of four-way branching in accordance with the invention illustrates further important features of the present invention. Of particular importance is the fact that the only logic external to the Address PROM 18 required for providing this flexible four-way branching capability is the relatively simple logic illustrated in FIG. 7 for producing the test result signals Q1 and Q2 derived from testing selected ones of the system condition signals, there being no need for the special branching logic normally required in known microprogramming approaches, such being provided in accordance with the present invention within the Address PROM 18. In addition, it is significant to note that there is no restriction whatsoever on the choice of the particular next microinstruction address aM' and/or associated test select bits J' which may be stored in each of the possibly addressable storage locations of the Address PROM 18, as in certain known systems which derive or generate a branch address by use and/or modification of one or more particular addresses made available during each machine cycle. Still further, it is to be noted that different branching paths can be provided within a microroutine in accordance with the present invention by providing the same next microinstruction address in more than one Address PROM storage location, but with different test select bits, such as illustrated for the Address PROM storage locations corresponding to Q1Q2 = 10 and 11 of Block 54 which are provided with the same next microinstruction address aM6, but with different test select bits J6 and J6'.

The remaining portion of the multiplication operation occurring as a result of the flow proceeding to Block 55 will next be considered. As shown in FIG. 8, during Block 55, 1 values are provided for only microinstruction control signals $m_2$, $m_5$ and $m_{10}$ so as to cause R1 to be applied to the right adder input RA in FIG. 4, (−1) to be applied to the left adder input LA from the true/complement gate 27, and the resulting adder output AO, which will thus be R1 − 1, to be applied to the input of R1 for setting therein when the clock pulse (FIG. 5) occurs at the end of the Block 55 machine cycle.

As illustrated in FIG. 8, the J5 values provided during Block 55 have a 1 value for $J_z$, $J_s$ and $J_i$ and a 0 value for $J_f$. Accordingly, as will be evident from FIGS. 4, 6 and 7, the R1 − 1 result provided at the adder output during Block 55 is tested for zero and sign (Diamond 55a) and, if R1 − 1 is either zero or negative, an interrupt test is then made (Diamond 54c). The branching occurring in response to this testing during Block 55 is evident from FIG. 8. If Q1Q2 = 00 or 01, which occurs when R1 − 1 ≠ 0, then branching is back to Block 54, regardless of the value of the interrupt signal I, since the next microinstruction address aM' and test select bits J' stored in both of the aM500 and aM501 storage locations of the Address PROM 18 are aM4 and J4, respectively. When Q1Q2 = 10 for Block 55, which occurs when R1 − 1 is either zero or negative and there is no interrupt present, then branching is to Block 56, since the next microinstruction address aM' and J' bits stored in the aM510 storage location of the Address PRM are aM6 and J6, respectively. Finally when Q1Q2 = 11 during Block 55, indicating that R1 − 1 is either zero or negative and an interrupt is also present, then branching is to Block 57, since the next microinstruction address aM' and test select bits J' stored in the aM511 storage location of the Address PROM 18 are aM6 and J6', respectively.

The operations occurring when the flow loops back to Block 54 from Block 55 will be as described previously and need not be repeated, it being understood that the loop will be repeated until at $R1 - 1 = 0$ condition is detected during Block 55, in which case the flow proceeds to either Block 56 or 57 depending upon the results of the interrupt testing indicated by Diamond 54c in FIG. 6. It will be remembered that branching to Blocks 56 or 57 depending upon whether or not an interrupt is present may also occur from Block 54 in the event that the multiplicand initially set into register R2 in FIG. 4 is zero. Thus, the operations to now be described with respect to Blocks 56 and 57 will be applicable whether branching thereto occurs from either Block 54 or Block 55.

It will be noted that Blocks 56 and 57 each provide for performance of the same microinstruction M6 which has 1 values for only microinstruction signals $m_9$ and $m_{12}$ so as to cause the product contained in register R3 to be transferred via adder 25 in FIG. 4 to MSU 10. In order to illustrate a further capability in accordance with the present invention, Blocks 56 and 57 have been provided with different test select bits J6 and J6', respectively, in order to demonstrate how different branching can be provided therefrom without the need for providing special logic external to the Address PROM 18 for this purpose Thus, as indicated in FIG. 8, the values of the J6 test select bits for Block 56 are all 0s which necessarly results in a $Q1Q2 = 00$ condition being produced during the Block 56 machine cycle. Accordingly, branching from Block 56 to M10, as indicated in FIG. 6 (which may typically be the starting microinstruction of the next routine to be performed) is readily accomplished simply by storing microinstruction address aM10 and associated test select bits J10 in the aM600 storage location of the Address PROM 18. Provision for branching from Block 57 to an interrupt starting microinstruction M30, as illustrated in FIG. 6 is also readily accomplished simply by choosing appropriate values for the J6' test bits of Block 57, such as, for example, by choosing only $J_i$ to have a 1 value, which necessarily results in producing a $Q1Q2 = 01$ condition during Block 57. Accordingly, as illustrated in FIG. 8, the microinstruction address aM30 of the interrupt routine starting microinstruction M30 is stored in the aM601 location of the Address PROM 18. As also illustrated in FIG. 8, the remaining two Address PROM locations aM610 and aM611 are "don't care" Address PROM storage locations in the illustrative example being described, since the particular choice of J6 and J6' bits for Blocks 56 and 57 is such that these remaining two Address PROM storage locations cannot occur during Blocks 56 and 57.

It will be remembered that it was previously pointed out herein that the microinstructions stored in the Control PROM 14 could be provided in an encoded arrangement in order to reduce the number of microinstruction bits required. Similarly, the test select bits J provided in the Address PROM 18 along with each microinstruction address aM (see FIG. 3) could be encoded in order to decrease the number of J bits required to be provided in the Address PROM 18. For example, it will be appreciated that, where a system is to be provided with the capability of performing a significant number of microroutines, it may be expected that a correspondingly larger number of test select bits J and system condition signals will have to be applied to the conditions test logic 20 in FIG. 1 for producing appropriate Q values for these microroutines. In such a case, the conditions test logic 20 may advantageously be implemented in the form of a multiplexer using commercially available large scale integrated circuit chips. In such an implementation, the system condition signals would constitute the multiplexer inputs, the test select bits J would be encoded to serve as an address for the multiplexer, and the multiplexer output lines would be the test result signals Q.

Although the description of the invention provided herein has been primarily directed to particular illustrative embodiments in order to clearly demonstrate the basic principles of the invention and the manner in which it may be readily practiced so as to take advantage of the stated features and advantages, it is to be understood that many modifications and variations in structure, arrangement, components, operation and use are possible within the contemplated scope of the invention without departing from the spirit of the invention. The appended claims are accordingly intended to cover and embrace all such possible modifications and variations within the true spirit and scope of the invention.

What is claimed is:

1. In a data processing system, microprogramming control means comprising:
   a control memory for storing microinstructions at selectively addressable locations thereof;
   an address memory for storing microinstruction addresses at selectively addressable locations thereof;
   a first addressing means responsive to a microinstruction read out from said address memory for applying first address data to both said control memory and said address memory;
   said control memory being responsive to said first address data for reading out a selected microinstruction for performance by said system; and
   additional addressing means responsive to predetermined operations of said system for applying additional address data to said address memory;
   said address memory being jointly responsive to said first address data and said additional address data for reading out a microinstruction address from a selected location to said first addressing means for use as a next microinstruction address;
   said address memory having microinstruction addresses mapped in the storage locations thereof such that said first address data applied thereto designates a predetermined plurality of storage locations each storing a possible next microinstruction address, while said additional address data determines which one of said predetermined plurality of storage locations is to have its possible next microinstruction address read out therefrom for application to said first addressing means.

2. The invention in accordance with claim 1, wherein said microinstructions are stored in said control memory without replication.

3. The invention in accordance with claim 1, wherein said control memory and said address memory each comprise a programmable read only memory.

4. The invention in accordance with claim 1, wherein said first-mentioned addressing means comprises an address register for receiving a microinstruction address read out from said address memory and for providing address signals constituting said first address data.

5. The invention in accordance with claim 4, wherein said additional addressing means includes means for testing selected conditions of said data processing system and in response thereto deriving additional address signals constituting said additional address data.

6. The invention in accordance with claim 4, wherein during each of a plurality of repetitively occurring machine cycles a selected microinstruction is read out from said control memory in response to a current microinstruction address in said address register following which a next microinstruction address is read out from said address memory into said address register for addressing said control memory in the next machine cycle.

7. The invention in accordance with claim 1, wherein said address memory additionally contains test select data which is stored along with respective ones of said microinstruction addresses and which is read out from said address memory along with its respective microinstruction address.

8. The invention in accordance with claim 7, wherein said additional addressing means includes means for testing selected conditions of said data processing system as determined by corresponding test select data read out from said address memory and in response thereto deriving said additional address data.

9. The invention in accordance with claim 8, wherein said additional addressing means comprises a multiplexer having said selected conditions applied thereto as inputs, having said corresponding test select data applied thereto as an address, and having said additional address data provided as an output therefrom.

10. The invention in accordance with claim 1, wherein the mapping of microinstruction addresses in said address memory is chosen so that a first predetermined plurality of storage locations designatable by predetermined first address data has the same microinstruction address stored in each storage location, whereby to provide that the same next microinstruction address will be read out from said address memory in response to said predetermined first address data regardless of the value of said additional address data jointly applied thereto.

11. The invention in accordance with claim 10, wherein the mapping of microinstruction addresses in said address memory is further chosen so that a second predetermined plurality of storage locations designatable by other predetermined first address data has different microinstruction addresses stored in at least two storage locations thereof, whereby the particular next microinstruction address read out from said address memory in response to said other predetermined first address data will be dependent upon the value of said additional address data jointly applied thereto.

12. The invention in accordance with claim 11, wherein said additional addressing means includes means for testing selected conditions of said data processing system and in response thereto deriving said additional address data.

13. The invention in accordance with claim 12, wherein said address memory additionally contains test select data which is stored along with respective ones of said microinstruction addresses and which is read out from said address memory along with its respective microinstruction address.

14. The invention in accordance with claim 13, wherein said additional addressing means includes means for testing selected conditions of said data processing system as determined by corresponding test select data read out from said address memory and in response thereto deriving said additional address data.

15. The invention in accordance with claim 14, wherein said additional addressing means comprises a multiplexer having said selected conditions applied thereto as inputs, having said corresponding test select data applied thereto as an address, and having said additional address data provided as an output therefrom.

16. The invention in accordance with claim 14, wherein the storage of microinstruction addresses and test select data in said address memory is further chosen so that at least one particular microinstruction address is stored at a first storage location of said address memory along with test select data and is also stored at a second storage location of said address memory along with different test select data.

17. The invention in accordance with claim 16, wherein said first and second storage locations of said address memory are contained within a common predetermined plurality of storage locations so as to be designatable by the same first address data.

* * * * *

UNITED STATES PATENT OFFICE
CERTIFICATE OF CORRECTION

Patent No. 4,038,643          Dated  July 26, 1977

Inventor(s)  Dongsung Robert Kim

It is certified that error appears in the above-identified patent and that said Letters Patent are hereby corrected as shown below:

Col. 1, line 15, change "micro-" to --macro- --;
       line 18, change "of" to --or--;
       line 40, change "of", second occurrence, to --or--.
Col. 3, line 32, change "microninstruction" to --microinstruction--.
Col. 5, line 33, change "micronin-" to --microin---;
       line 45, change "microinstuction" to --microinstruction--;
       line 67, change "decodng" to --decoding--.
Col. 7, line 40, change "ocurrence" to --occurrence--.
Col. 9, line 7, change "signal" to --select--.
Col. 10, line 16, change "determind" to --determined--;
        line 40, change "apropriate" to --appropriate--;
        line 48, change "directy" to --directly--;
        line 64, change "isnow" to --is now--.
Col. 11, line 22, change "52" to --51--;
        line 34, change "durng" to --during--;
        line 36, change ""dont't" to --"don't--;
        line 43, between "test" and "signals", insert --select--.
Col. 12, line 11, change "$m_2 - m$" to --$m_1 - m_{12}$--;
        line 48, change "reslt" to --result--;
        line 52, change "miroinstruction" to --microinstruction--
        line 56, change "and" to --to--.
Col. 13, line 54, change "(i.e. Z = 9)" to --(i.e. Z = 0)--;
        line 57, delete "a";
        line 66, "R2 + R3 = 9" should be --R2 + R3 = 0--.

(Continued on next page)

UNITED STATES PATENT OFFICE
CERTIFICATE OF CORRECTION

Patent No. 4,038,643     Dated July 26, 1977

Inventor(s) Dongsung Robert Kim

It is certified that error appears in the above-identified patent and that said Letters Patent are hereby corrected as shown below:

(Continued)

Col. 14, line 37, change "$m_2$" to --$m_1$--;

line 63, change "PRM" to --PROM--.

Col. 15, line 6, change "at" to --an--;

line 31, change "necessarly" to --necessarily--.

Col. 16, line 23, change "embrance" to --embrace--.

*Signed and Sealed this*

*Eighteenth* Day of *October 1977*

[SEAL]

Attest:

RUTH C. MASON       LUTRELLE F. PARKER
*Attesting Officer*     *Acting Commissioner of Patents and Trademarks*